UNITED STATES PATENT OFFICE 2,406,578.

PRODUCTION OF PARA NITROACETANILIDE

Edward H. Bart, Elizabeth, N. J., assignor to American Cyanamid Company, New York, N. Y., a corporation of Maine No Drawing. Application March 2, 1946, Serial No. 651,626

3 Claims. (Cl. 260—562)

This invention relates to an improved process for producing p-nitraniline. P-nitraniline is used extensively as an intermediate in preparing dyestuffs. Particularly when used for the production of azo dyestuffs, it is necessary that the product be substantially free from o-nitraniline. Unfortunately, in the ordinary processes which involve the nitration of acetanilide followed by hydrolysis, considerable amounts of o-nitraniline are obtained which represents a waste, as pure o-nitraniline can be prepared more economically by other processes. Not only is there a lower yield of p-nitraniline but the o-nitraniline has to be separated, which involves a costly differential hydrolysis resulting in considerable loss of p-nitraniline.

The nitration of the acetanilide is customarily carried out by the standard procedures used in nitrations. That is to say, the acetanilide is dissolved in sulfuric acid and nitric acid added. Some theoretical studies have been made in the past on certain factors which influence the production of o-nitraniline, and it was generally found that a very large excess of sulfuric acid over acetanilide favored the production of p-nitraniline. Theoretically, it should be possible to use a large excess of sulfuric acid and obtain p-nitraniline practically uncontaminated with significant amounts of o-nitraniline. However, such a procedure is practically not feasible because the acid has to be thrown away, and the costs of operation including reduced output from equipment makes such a process impractical. A compromise is therefore chosen, and a sufficient excess of sulfuric acid is used so as to reduce the amount of o-nitraniline produced without using so large an excess as to render the process uneconomical.

Another factor which has been found to influence the production of o-nitraniline is temperature. The lower the temperature, the less o-nitraniline produced. However, this factor is not of great help, because if very low temperatures are used, acetanilide freezes out from sulfuric acid and coats the cooling coils or cooling jacket wall which preclude reducing the temperatures to the extent which theoretical considerations might indicate to be desirable.

The present invention constitutes a rather marked departure from ordinary nitration procedures, and it permits the production of p-nitraniline with negligible amounts of o-nitraniline by a process which is not wasteful of sulfuric acid, and which does not suffer from low yields. I have found that it is possible to dissolve acetanilide in approximately stoichimetrical amounts of concentrated nitric acid. This is most surprising, as clear liquid is obtained which is stable at low temperature in spite of the fact that the acetanilide has a negative heat of solution. The mixture of acetanilide and nitric acid can then be gradually added to the sulfuric acid in the vessel. Nitration proceeds very rapidly, and, of course, at all times there is a very large excess of sulfuric acid, based on the acetanilide, even though the amount of sulfuric acid used is but little in excess of that theoretically required, and much smaller than the large amounts of sulfuric acid used as a compromise in the processes which have been employed hitherto.

The enormous saving in sulfuric acid accompanied by reduction of o-nitraniline production is obtained without the necessity of using unfavorable temperatures. On the contrary, it is possible to use even lower temperatures so that the favorable effect of low temperatures on o-nitraniline contamination, can be utilized to a much larger extent than was feasible in the process as hitherto used. In other words, the present invention does not represent a compromise, but permits simultaneous utilization of optimum values of both factors influencing o-nitraniline production. It is a rare thing in chemical reactions that a new process is better on all counts; usually it represents a compromise, the advantages of one procedure being partly offset by accompanying disadvantages.

A comparison of the present process with two typical processes used in the past, is brought out in the accompanying table which clearly shows the great advantage in sulfuric acid ratio obtainable.

$$\text{Ratio} = \frac{\text{Number of parts of sulfuric acid present}}{\text{Number of parts of unreacted acetanilide present}}$$

| Percent of total quantity of nitric acid added | Process A | Ratio | Process B | Ratio | Process C | Ratio |
|---|---|---|---|---|---|---|
| 0 | 350/100 | 3.5 | 300/100 | 3.0 | | |
| 1 | 350/99 | 3.5 | 300.5/99 | 3.0 | 350/1 | 350 |
| 10 | 350/90 | 3.9 | 305/90 | 3.4 | 350/1 | 350 |
| 30 | 350/70 | 5.0 | 315/70 | 4.5 | 350/1 | 350 |
| 50 | 350/50 | 7.0 | 325/50 | 6.5 | 350/1 | 350 |
| 100 | 350/1 | 350 | 350/1 | 350 | 350/1 | 350 |

Process A: 100 parts of acetanilide are dissolved in 350 parts of sulfuric acid and the nitric acid is added thereto.

Process B: 100 parts of acetanilide are dissolved in 300 parts of sulfuric acid and the remaining 50 parts of sulfuric acid are added with the nitric acid as "mixed acid."

Process C: 100 parts of acetanilide are dissolved in the nitric acid and this solution is added portionwise to the entire amount of sulfuric acid.

The customary ratio of 100 parts of acetanilide to 350 parts of sulfuric acid is employed in the above table for purposes of illustration, but the same general differences would be observed if this ratio is varied within such limits as normally occur in commercial practice. It is assumed in all cases that nitration proceeds approximately at the rate at which the nitric acid is added, so that the amount of unreacted acetanilide at any stage of the nitration is the difference between the amount present and the amount which has been nitrated, as determined by the percent of nitric acid added.

As can be readily observed from the above table, whereas in the process of my invention (C) the ratio of sulfuric acid to acetanilide throughout the nitration is constant at a very large ratio, in the case of the prior art processes (A, B) this ratio starts at a figure less than one-hundredth as large and approaches in magnitude the same ratio as the process of my invention only when the last small portions of nitric acid are added.

This method therefore makes it possible to carry out the nitration in such a manner that the ratio of sulfuric acid to acetanilide will be very high during the greater part of the nitration, without using larger quantities of sulfuric acid. Since smaller quantities of acetanilide are dissolved in the sulfuric acid at any time up until the last small portions of nitric acid are added, no difficulties are encountered with the freezing out of the acetanilide at the lower temperatures preferred for the nitration.

The yields of the p-nitraniline recoverable in commercial operations by this method are materially increased and approach the theoretical amount. The amount of the o-nitraniline formed is so small that separate hydrolysis of the two isomers is unnecessary. Merely quenching the nitrated mixture in water and ice, and filtering and washing the resulting precipitate free of acid will reduce the quantity of the ortho isomer to negligible proportions. The p-nitraniline so obtained is of exceptional purity and is especially suitable as a dye intermediate.

Improved results are obtained according to the present invention as compared to former processes, even though varying concentrations and proportions of the nitric and sulfuric acids are used. Best results are obtained, however, with nitric acid of approximately 45° Bé, and sulfuric acid of 93-98% concentration. In the preferred modification of my process only approximately theoretical proportions of the 45° Bé. nitric acid are required for the nitration, using 3-4 parts of 98% sulfuric acid and lowered temperatures ($-10°$ to $+5°$ C.) throughout the entire operation. A thorough stirring is advisable to avoid partial overheating and thus formation of the ortho isomer.

The invention will be illustrated in greater detail in conjunction with the following specific example which is typical. All parts are parts by weight.

Example

Six hundred parts of acetanilide are dissolved in 366 parts of 45° Bé. nitric acid at a temperature of 0-5° C. This solution is slowly added with stirring to 2,155 parts of 97.6% sulfuric acid which has been previously cooled to $-1°$ C. During the addition the temperature is slowly lowered to approximately $-10°$ C. when 20% of the acetanilide has been added. The nitration is continued at this temperature until all the solution of acetanilide in nitric acid has been added. The nitrated mixture is quenched in 9,250 parts of water and 1,625 parts of ice. The final temperature after quenching is 30° C. The resulting precipitate of p-nitroacetanilide is filtered and washed free of acid, using approximately 36,500 parts of water. The p-nitroacetanilide is hydrolyzed by adding it in small portions to 2,500 cc. of hot water containing 190 parts of caustic soda. 580 parts of pure p-nitraniline are obtained.

I claim:

1. A process for the production of p-nitroacetanilide, which comprises mixing acetanilide with concentrated nitric acid and thereafter slowly adding the resulting liquid to previously cooled concentrated sulfuric acid.

2. A process for the production of p-nitroacetanilide, which comprises mixing acetanilide with approximately 45° Bé. nitric acid at 0-5° C., and thereafter slowly adding the resulting liquid with agitation to previously cooled sulfuric acid of approximately 98% concentration so that the temperature of the resulting mixture is 0 to $-10°$ C.

3. A process for the production of p-nitroacetanilide, which comprises mixing one part of acetanilide with substantially equivalent proportions of approximately 45° Bé. nitric acid at 0-5° C., and thereafter slowly adding the resulting liquid with stirring to 3-4 parts of a previously cooled sulfuric acid of approximately 98% concentration so that the temperature of the resulting mixture is 0 to $-10°$ C.

EDWARD H. BART.